UNITED STATES PATENT OFFICE.

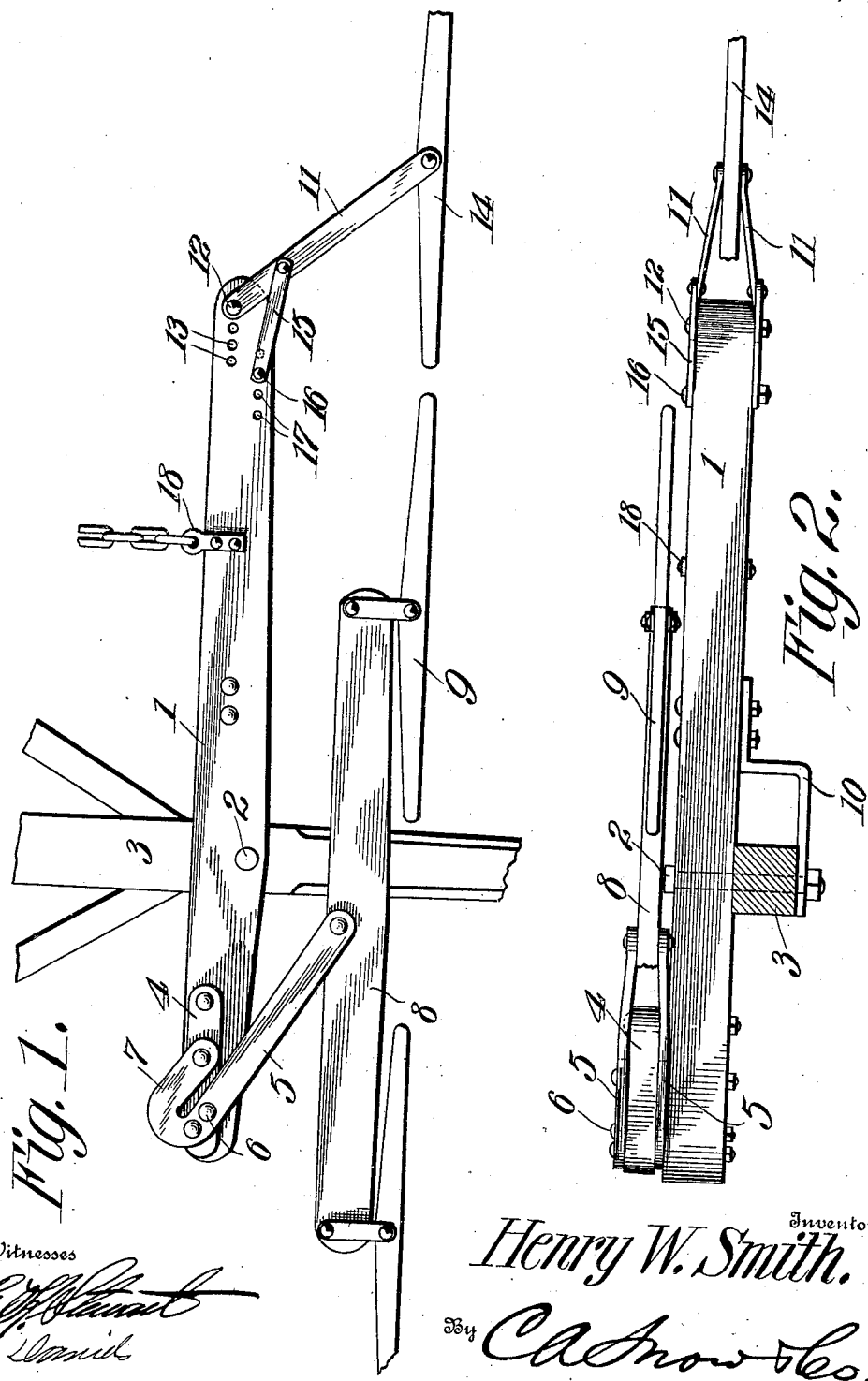

HENRY W. SMITH, OF GAGE, OKLAHOMA.

DRAFT APPLIANCE.

No. 925,396.  Specification of Letters Patent.  Patented June 15, 1909.

Application filed July 20, 1908. Serial No. 444,385.

*To all whom it may concern:*

Be it known that I, HENRY W. SMITH, a citizen of the United States, residing at Gage, in the county of Ellis and State of Oklahoma, have invented a new and useful Draft Appliance, of which the following is a specification.

This invention has relation to draft appliances and it consists in the novel construction and arrangements of its parts, as hereinafter shown and described.

The object of the invention is to provide a draft appliance to which three horses may be attached and the parts of which may be arranged as to equalize the strain to desired degrees upon the different animals, making up the draft team. The parts of the appliance are so arranged that the members of a pair of animals which are connected with a double tree, work upon opposite sides of a tongue, while a third animal may work at the side of one of the animals included in the first mentioned pair of animals.

With this object in view the draft appliance consists primarily of a draft beam which is pivotally connected at a point distant from one of its ends equal to one third of its length to a tongue. A frame is fixed to the shorter end portion of the said draft beam and is disposed toward the tongue, and a double-tree is pivoted to said frame and lies transversely across the tongue. Swingle trees are connected with the said double trees, and a pair of draft animals may be connected with the said swingle trees and the members of the said pair of animals are located at the opposite sides of the tongue. A secondary frame is attached to the longer end of the draft beam and a swingle tree is connected with the said secondary frame. The third draft animal may be hitched to the last said swingle tree and thus all of the animals composing the team may be abreast while two of them are located at one side of the tongue, and the third at the opposite side of the tongue, and the draft may be divided among the animals to suitable degrees, and evenly applied to the said draft beam.

An advantage gained by the arrangement set forth is that the horses or animals are located close together and are free from interference one with the other, while the pull upon each animal may be regulated to a nicety. Thus the entire pulling force of all of the animals composing the team may be acquired without subjecting any particular animal to over-strain or excessive work.

Figure 1 is a top plan view of the appliance, and Fig. 2 is a front elevation of the same.

The draft appliance consists of the draft beam 1, which is pivotally connected at the point 2, with the tongue 3. The said point 2 is located approximately one third of the length of the beam 1 from one end thereof. The block 4, is mounted upon the shorter end portion of the beam 1, and the binary arms 5, are attached at their rear ends to the upper and lower sides of the said block 4. The securing bolts 6, pass transversely through the rear end portions of the arms 5, and also pass through the block 4, and the shorter end portion of the beam 1. Three of the bolts 6, pass through the arms 5, and the beam 1, consequently the said arms are held in fixed relations to the shorter end portion of the said beam. The extremities 7, of the rear end portions of the arms 5, are bent back upon the intermediate portions of the said arms, and are also secured to the block 4 and the beam 1, as above described. The double-tree 8, is pivotally mounted between the forward end portions of the arms 5, and lies transversely across the tongue 3. The forward end portions of the said arms 5 are disposed toward the tongue 3, and consequently the said arms are pitched at an acute angle to the line of draft. The swingle-trees 9 are pivotally connected with the end portions of the double-tree 8, in the usual manner and the said swingle-trees lie upon opposite sides of the tongue 3. The bracket 10, is attached to the under side of the beam 1, at a point between the pivot 2 and the extremity of the longer end of the said beam. The opposite end of the said bracket 10 is connected with the lower portion of the pivot 2. By providing such a bracket the longer end of the beam 1 is supported, and the said beam will not have a tendency to tilt laterally upon the tongue 3. The arms 11, are connected with the longer end portion of the beam 1, and may be adjusted thereon by means of passing the bolt 12 transversely through any one of the series of perforations 13, provided in the longer end portion of the said beam 1.

The swingle-tree 14 is pivotally mounted between the forward end portions of the arms 11, and may assume transverse alinement with the swingle-trees 9, mounted upon the double-tree 8. The braces 15 are connected at their forward ends with the arms 11, and at their rear ends are connected adjustably by means of the bolt 16, which passes transversely through the said braces and also through any one of the series of perforations 17, provided in the end portion of the draft beam 1. An eye 18 is attached to the longer end portion of the draft beam and to this eye is connected a draft chain, fastened to any convenient portion of the vehicle or machine to which the invention is applied. The forward end portions of the arms 11 extend in the same general direction as the forward end portions of the arms 5, and consequently the said arms 11 lie at an acute angle to the line of draft of the tongue 3. By reason of the fact that the longer end of the draft beam 1, is provided with the series of perforations 13 and 17, the angle at which the said arms 11 lie with relation to the line of draft may be regulated, and the said arms 11 may be so positioned as to bring the swingle-tree 14 in close proximity with the adjacent swingle-tree 9. Thus it is possible to have all of the animals of the team close together and at the same time abreast, and the arms 11 may be positioned upon the longer end portion of the draft beam 1, so that the animal connected with the swingle-tree 14 will have a greater or less leverage with relation to the animals connected with the shorter end of the draft beam 1, as desired.

Having described my invention, what I claim as new, and desire to secure by Letters Patent is:—
In combination with a tongue, a draft appliance comprising a draft beam pivotally mounted upon the tongue, and having relatively long and short end portions, an arm fixed to the short end portion of the beam, and being disposed, at its forward end toward the tongue, a double tree pivoted to the arm, and lying transversely of the tongue, swingle-trees attached to the doubletree, an arm attached at one end to the longer end portion of the draft beam, said end being adjustable toward and from the pivot of the draft beam, and the forward end portion of the arm being disposed away from the tongue, a swingle-tree attached to the last said arm, a brace extending from the last said arm to the draft beam, and adjustably connected to the latter, and holding said arm in a fixed position with relation to the draft beam, and a chain connected to the longer portion of the draft beam for limiting the forward swinging movement thereof.

In testimony that I claim the foregoing as my own, I have hereto affixed my signature in the presence of two witnesses.

HENRY W. SMITH.

Witnesses:
W. L. CLARK,
M. J. WEST.